United States Patent
Kohli et al.

(10) Patent No.: US 10,346,856 B1
(45) Date of Patent: Jul. 9, 2019

(54) PERSONALITY AGGREGATION AND WEB BROWSING

(75) Inventors: Pushmeet Kohli, Cambridge (GB); Filip Radlinski, Vancouver (CA); Michael Stanislaw Kosinski, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 916 days.

(21) Appl. No.: 13/571,221

(22) Filed: Aug. 9, 2012

Related U.S. Application Data (63) Continuation of application No. 13/179,262, filed on Jul. 8, 2011, now abandoned.

(51) Int. Cl.
*G06N 5/00* (2006.01)
*G06Q 30/02* (2012.01)

(52) U.S. Cl.
CPC .............. *G06Q 30/02* (2013.01); *G06N 5/00* (2013.01)

(58) Field of Classification Search
CPC .......... G06N 5/04; G06N 99/005; G06N 5/02; G06N 5/003; G06Q 30/02
USPC .......................................................... 706/46
See application file for complete search history.

(56) References Cited

U.S. PATENT DOCUMENTS

| | | | |
|---|---|---|---|
| 8,589,328 B1 * | 11/2013 | Sharma ................. | G06Q 10/063 434/236 |
| 8,719,200 B2 * | 5/2014 | Beilby ................... | G06N 3/004 706/45 |
| 8,732,569 B2 * | 5/2014 | Burkard ............. | G06F 17/30902 715/206 |
| 2002/0112048 A1 * | 8/2002 | Gruyer ................... | G06Q 30/02 709/224 |
| 2006/0155764 A1 * | 7/2006 | Tao ..................... | G06F 17/30867 |
| 2007/0239680 A1 * | 10/2007 | Oztekin ............. | G06F 17/30867 |
| 2009/0070443 A1 * | 3/2009 | Vanderhook ........... | G06Q 30/02 709/222 |
| 2009/0222431 A1 * | 9/2009 | Kumar ............... | G06F 17/30867 |
| 2010/0121810 A1 * | 5/2010 | Bromenshenkel .. | G06F 3/04815 706/54 |
| 2010/0122182 A1 * | 5/2010 | Bromenshenkel ...... | G06F 3/011 715/745 |

(Continued)

OTHER PUBLICATIONS

Bloch et al.—How to Defend Your Website Against Click Fraud—2004.*

(Continued)

*Primary Examiner* — Scott A. Waldron
*Assistant Examiner* — Viker A Lamardo (57) ABSTRACT

Personality aggregation and web browsing is described, for example, to find personality profiles of website audiences for use in recommendation systems, advertising systems, or other web services. In an embodiment natural browsing sequences of users who have given their consent are submitted to a pattern matching process to identify personality trait scores serendipitously occurring in the sequences. In an embodiment, an aggregator combines the personality trait scores by website to obtain audience personality profiles. In an example, a machine learning process carries out the aggregation and enables audience personality profiles of other websites to be predicted. For example, a random decision forest is trained using the natural browsing sequences having identified personality trait scores and once trained, is used to predict personality trait scores of other websites.

20 Claims, 8 Drawing Sheets

(56) References Cited

U.S. PATENT DOCUMENTS

| | | | | |
|---|---|---|---|---|
| 2011/0093331 A1* | 4/2011 | Metzler | G06F 17/30864 | 705/14.49 |
| 2011/0161279 A1* | 6/2011 | Rao | G06Q 30/08 | 706/52 |
| 2011/0179116 A1* | 7/2011 | Solomon | G06Q 30/02 | 709/204 |
| 2011/0191231 A1* | 8/2011 | Zuver, Jr. | G06Q 40/04 | 705/37 |
| 2011/0276408 A1* | 11/2011 | Toole | G06Q 30/02 | 705/14.66 |
| 2011/0307319 A1* | 12/2011 | Balestrieri | G06Q 30/02 | 705/14.39 |
| 2012/0059785 A1* | 3/2012 | Pascual Leo | G06Q 30/02 | 706/50 |
| 2012/0158503 A1* | 6/2012 | Mardikar | G06Q 30/0255 | 705/14.53 |
| 2012/0166467 A1* | 6/2012 | Feild | G06F 17/30867 | 707/768 |
| 2012/0173338 A1* | 7/2012 | Ariel | G06F 17/3071 | 705/14.53 |
| 2012/0290515 A1* | 11/2012 | Frank | G06N 99/005 | 706/12 |
| 2015/0324434 A1* | 11/2015 | Greenwood | G06N 99/005 | 707/722 |

OTHER PUBLICATIONS

Moe et al.—Capturing Evolving Visit Behavior in Clickstream Data—2001.*

Bock et al.—Predicting web site audience demographics for web advertising targeting using multi-web site clickstream data.*

Weber et al.—The Demographics of Web Search—Jul. 19-23, 2010.*

StumbleUpon—Wikipedia, the free encyclopedia, https://web.archive.org/web/20081206015711/http://en.wikipedia.org/wiki/StumbleUpon , Nov. 28, 2008.*

* cited by examiner

PERSONALITY AGGREGATION AND WEB BROWSING

This application is a continuation of, and claims priority to, commonly assigned co-pending U.S. patent application Ser. No. 13/179,262, entitled "Personality Aggregation and Web Browsing," filed on Jul. 8, 2011, the entire disclosure of which is incorporated by reference herein in its entirety.

BACKGROUND

The study of personality has typically focused on self-reported answers to carefully crafted questionnaires. Various models of personality have been proposed by psychologists. For example, one model that has been successful in explaining variability across individuals is based on five orthogonal dimensions (also referred to as traits), commonly termed the "Big Five": Openness to Experience, Conscientiousness, Extraversion, Agreeableness and Neuroticism. These dimensions have been shown to efficiently explain a substantial amount of variability in human preferences and behavioral dispositions across different domains of life and activities. They have been shown to be genetically heritable, stable over time and consistent across genders, cultures, and races. It is noted that personality traits differ from demographic information such as age, gender, mean income, race, and education.

Obtaining personality trait scores of individuals is typically a time consuming, complex and expensive process. In order to obtain accurate results personality questionnaires are lengthy and time consuming to complete. In addition, consent needs to be sought from individuals before assessing their personality and to make use of their individual data. The accuracy of any personality results may also be questionable as it is easy for individuals to deliberately bias their answers or to make random responses.

The embodiments described below are not limited to implementations which solve any or all of the disadvantages of known personality aggregation systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Personality aggregation and web browsing is described, for example, to find personality profiles of website audiences for use in recommendation systems, advertising systems, or other web services. In an embodiment natural browsing sequences of users who have given their consent are submitted to a pattern matching process to identify personality trait scores serendipitously occurring in the sequences. In an embodiment, an aggregator combines the personality trait scores by website to obtain audience personality profiles. In an example, a machine learning process carries out the aggregation and enables audience personality profiles of other websites to be predicted. For example, a random decision forest is trained using the natural browsing sequences having identified personality trait scores and once trained, is used to predict personality trait scores of other websites.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an advertising system or recommendation system, the system described is provided as an example and not a limitation. As those skilled in the art will appreciate, the present examples are suitable for application in a variety of different types of web-based systems.

Figure 1:
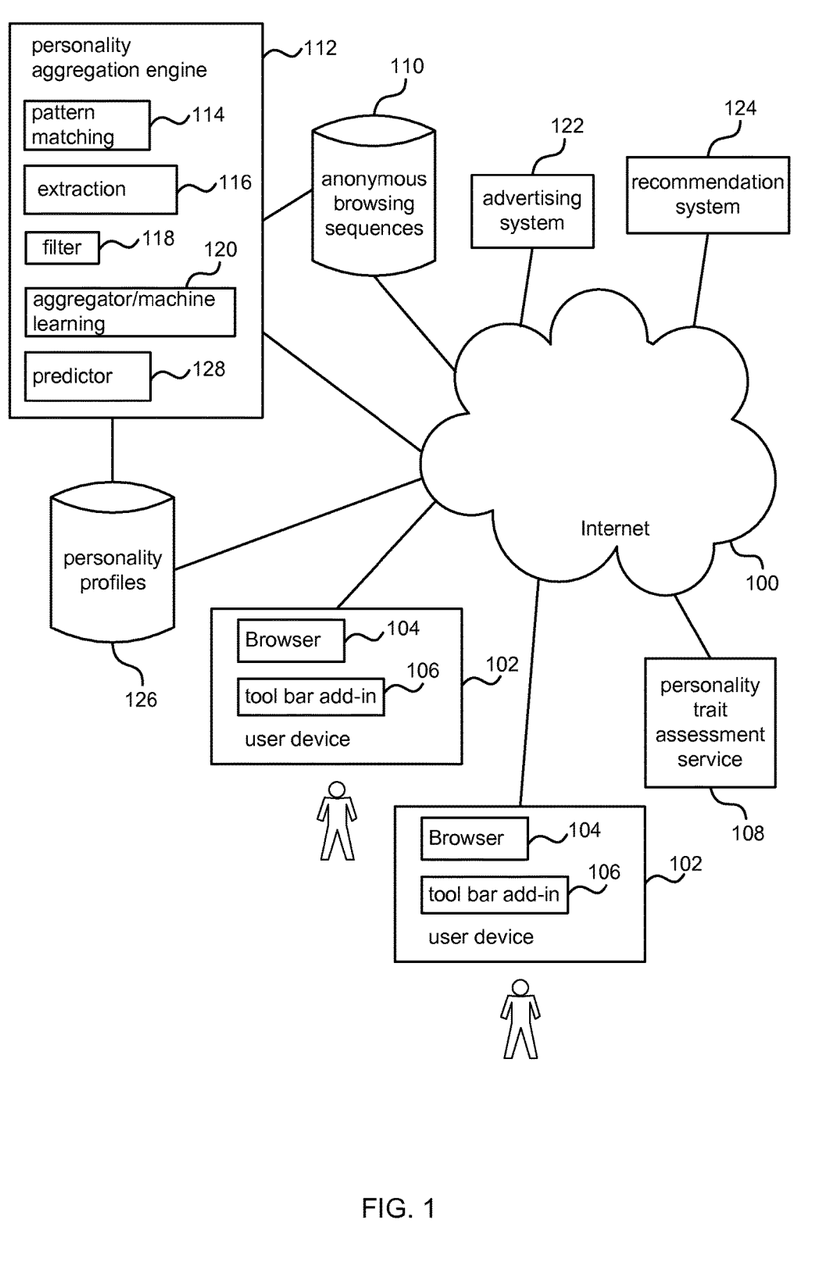
FIG. 1 is a schematic diagram of a personality aggregation system for use with an advertising system, recommendation system or other web-based service.

FIG. 1 is a schematic diagram of a personality aggregation system for use with an advertising system 122, recommendation system 124 or other web-based service. A plurality of users are able to connect to the internet 100 (or other communications network such as an intranet) using user devices 102. The internet 100 or other communications network comprises at least one personality trait assessment service 108 which provides a web based service whereby a user is able to have his or her personality assessed for one or more personality traits. The location of the personality trait assessment service 108 may be unknown to the personality aggregation system and details of the type of personality assessment offered are not required by the personality aggregation system. Users give their consent to have their personality assessed and the assessment process may be explicit, implicit or a combination of both types of process. Explicit personality assessment involves requesting a user to make judgments such as by answering a questionnaire; implicit personality assessment may comprise observing a user's behavior. Although FIG. 1 shows only one personality trait assessment service 108, in practice there may be many such services of the same or different types and these may be integral with other services such as social networking services, employment agency services, health services and other services.

Only two users are illustrated in FIG. 1 for clarity although in practice many millions of users may be present. Each user device 102 comprises a browser 104 of any suitable type for browsing web sites provided over the internet 100 or other communications network. The user devices 102 may be hand held devices, personal computers, laptops or any other communications device having a browser 104 and able to connect to the internet 100 or other communications network.

Consent is requested from users in order to capture anonymous browsing data. For example, each user device may comprise a tool bar add-in 106 arranged to capture browsing data such as URL (uniform resource locator) browsing data generated at the browser 104 of the user device. Any browsing data capture component may be used for which the user has given consent. For example, the browsing data capture component may be a tool bar add-in 106, may be integral with the browser 104, may be provided at the user device 102 or at another location, or may be combinations of two or more of these options. The browsing data capture component is also arranged to send the captured browsing data to at least one anonymous browsing sequence database 110 or other store. The browsing data capture component may remove and discard data from the captured browsing data in order to remove any information which may identify the user. For example, by removing any IP address information. In this way, anonymous browsing sequence data is sent to the database. Note that from any particular user device 102, browsing data may be captured and sent to the database from a plurality of users in the case where a personal computer or other user device and browser is shared.

The browsing data capture component may also remove and discard any data from the browsing sequence which is identified as being redundant; for example, repeated host names or other redundant information.

In an example, captured browsing data may comprise sequences of URLs appearing in a browser toolbar during operation of the browser to view web sites. The configuration of a web page being viewed at a given time may be the result of a user having made particular user selections and/or data entry. Data about those user selections may be included in the URL at the browser toolbar. For example, where a query is entered to a search engine the URL at the toolbar may comprise a host name of the search engine as well as the query terms. In the case that a web service provides a personality trait assessment service the URL at the toolbar may comprise a host name of the web service and personality indicators such as personality trait scores on each of a plurality of personality trait dimensions. The particular format of the personality indicators and their location in the URL may vary depending on the configuration of the web service.

In the example illustrated in FIG. 1 a single database is illustrated for storing naturally observed anonymous browsing sequences 110. In practice, for web-scale applications involving millions of users and terabytes of information the browsing sequences may be stored in a distributed manner. Storing such large amounts of data is expensive, complex and error prone. A personality aggregation engine 112 is provided to aggregate the data either dynamically as new data arrives or in batches off-line (or with a combination of these approaches). In this way the methods described herein may be scaled up for web-scale operation by discarding data once it has been used for aggregation.

A computer-implemented personality aggregation engine 112 is provided. This has access to the anonymous browsing sequences 110 and uses those to generate and store personality profiles 126 which may be website audience personality profiles or website class audience personality profiles (for classes or subclasses of web sites according to a taxonomy). A website audience personality profile comprises one or more scores for personality traits which represent aggregate personality traits of users who view the website.

The naturally observed anonymous browsing sequences comprise noisy data, errors, sequences comprising only one URL, sequences comprising many URLs potentially generated by different users sharing the same browser and other natural browsing sequences. There is a huge volume of this data and this makes it difficult to "see the wood from the trees" and avoid biases, noise and errors.

The personality aggregation engine 112 may comprise a pattern matching component 114, a extraction component 116, a filter 118, an aggregator or machine learning component 120 and a predictor 128. One or more of these components may be combined.

The pattern matching component 114 is arranged to identify browsing sequences which comprise personality trait scores and/or other personality indicators. This is a difficult task because of the huge volume of anonymous browsing sequences and because the majority of these sequences are unlikely to contain any personality trait scores since the data is naturally observed. Only where a user happens to have visited a personality trait assessment service 108, given consent for personality assessment and successfully completed an online personality test will any personality trait scores be present. In an example, the pattern matching component implements expression matching against a list of specified personality test websites. Another example comprises searching all URLs viewed for URLs with at least a specified number of parameters (such as at least 5 parameters for each of 5 personality trait dimensions) and/or URLs containing words that suggest a personality test, and then checking if the parameters resemble personality scores (for example by checking whether they are numerical and within the same approximate range). This may then be followed by identifying features of URLs that are indicative of personality tests and then using those to identify other personality tests.

The extraction component 116 is arranged to identify host names or other subsets of URL sequences or in some cases, to extract whole URLs. In an example a rule-based approach is used whereby the first part of a URL is extracted. For example, the URL http://www.dummyexample/example1/drawing.html may yield the host name www.dummyexample.com. However, it is not essential to identify host names from the URL sequences. The full URL itself may be used or a subset of the full URL extracted such as the domain name (e.g. dummyexample.com), or other subset. The extraction component 116 may take only the browsing sequences which have already been identified as comprising personality trait scores.

A filter component 118 is optionally used. This may be arranged to filter out browsing sequences which comprise only one web site or less than a threshold number of URLs. This component may also be arranged to filter out browsing sequences which appear to be erroneous for some reason or generated by automated computing entities rather than human users. For example, this may be achieved by filtering out browsing sequences with a duration greater than a working day, a duration of website visits greater than a threshold, a browsing sequence comprising more URLs than a threshold or using other criteria or combinations of one or more criteria.

An aggregator 120 which optionally comprises a machine learning component is arranged to aggregate the personality trait scores in order to produce personality profiles which are stored at a database 126. The personality profiles comprise website audience personality profiles and/or website class audience personality profiles. The aggregator 120 takes input from the extraction component 116 and the pattern matching component 114 where that input has optionally been filtered using filter 118.

A predictor 128 is optionally provided at the personality aggregation engine 112. The predictor is computer implemented and may be arranged to predict a web site audience personality profile for a new web site. For example, by assessing a class to which the new web site belongs and assigning the new web site the same audience personality profile as that already determined for the appropriate web site class.

Figure 2:
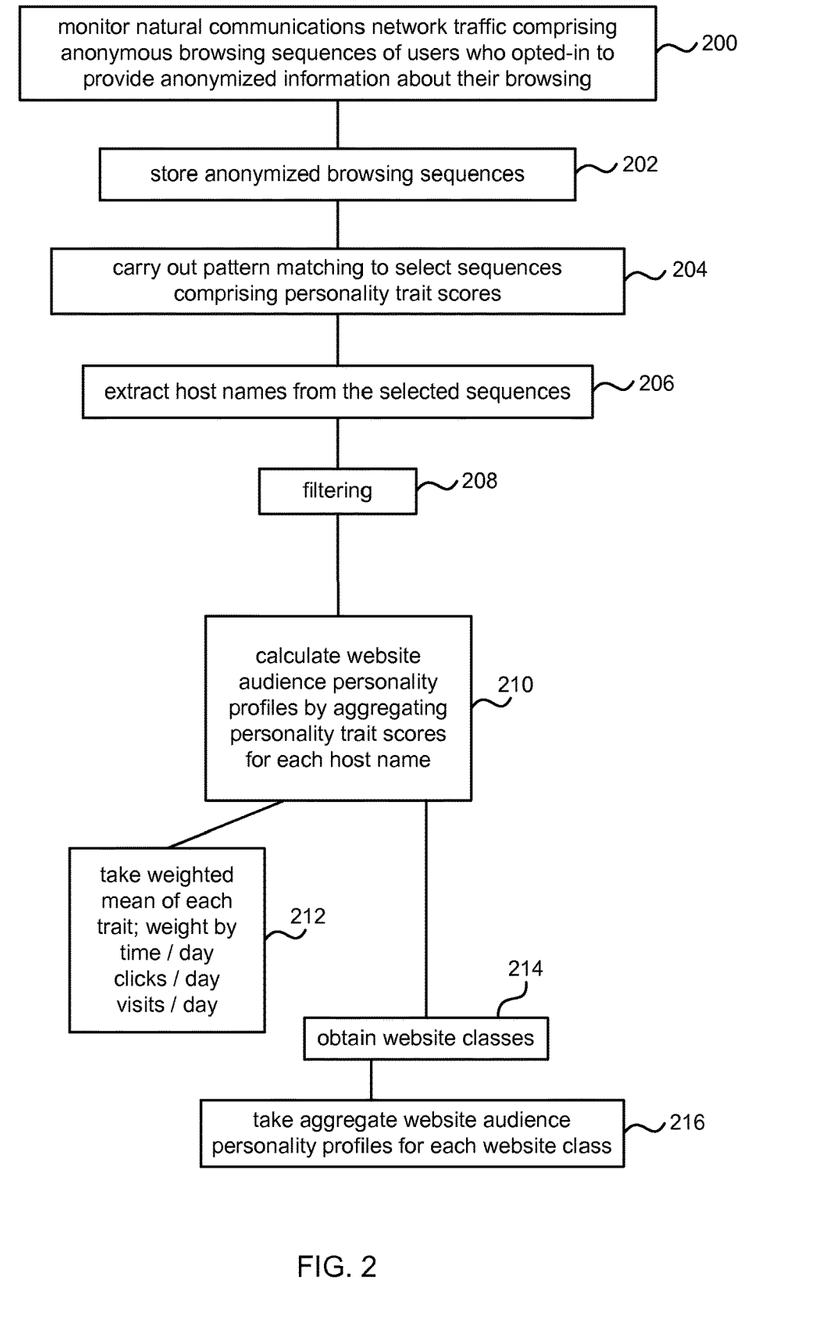
FIG. 2 is a flow diagram of a method at the personality aggregation engine of FIG. 1.

FIG. 2 is a flow diagram of a method at the personality aggregation engine of FIG. 1. Natural communications network traffic is monitored comprising anonymous browsing sequences of users who opted-in to provide anonymized information about their browsing. For example, browsing data capture components are used at user devices to capture natural sequences of URLs. The sequences are natural in that users are not required or requested to visit personality trait assessment services 108. Any users which do visit personality trait assessment services 108 do so serendipitously. The browsing sequences are anonymous as the users (or groups of users) who generated those sequences may not be identified from the sequences. For example, any IP addresses in the sequences may be removed. The anonymized browsing sequences are stored 202. For example, at a secure location or in a secure distributed manner.

Pattern matching is carried out 204, for example, using pattern matching component 114. This enables browsing sequences which comprise personality trait scores to be selected. Host names, other subsets of URLs or complete URLs are then extracted 206 from the selected sequences, for example, using the extraction component 116. Filtering 208 is optionally carried out to discard browsing sequences which comprise only a few web sites, which appear to comprise errors, or which appear to be generated by automated systems rather than human users. The filter may discard browsing sequences which have any one or more of a duration greater than a working day, a duration of website visits greater than a threshold, a browsing sequence comprising more URLs than a threshold. The filter may use combinations of one or more of these criteria or other criteria.

An aggregator component 120 is arranged to calculate 210 website audience personality profiles by aggregating personality trait scores for individual extracted host names or other parts of URLs or complete URLs. For example, by identifying all the browsing sequences which include visits to a particular host name and aggregating the personality trait scores found in those identified browsing sequences. In some examples the aggregator component 120 implements a form of frequency filtering whereby if, for a particular web site, the number of browsing sequences with personality trait scores is too low, then no website audience personality profile is generated.

The aggregation may be a weighted aggregation 212. For example, the personality trait scores may be assigned a weight according to the number of visits per day observed for the host name (or other extracted part of a URL or complete URL) in all the browsing sequences. The weights may be assigned according to other criteria such as the time spent per day at the host name, the number of clicks per day, the number of visits per day or other criteria. For example, a user may visit a site for 5 hours and during that time click on 100 different items on the site so that the number of visits the user makes to the site in the day is 1 and the number of clicks the user makes at the site in the day is 100. In some embodiments web site classes are obtained 214 for the extracted host names, URL subsets or whole URLs. For example, a taxonomy of website classes and subclasses is specified. The extracted host names are placed into an appropriate web site class and/or sub class using the taxonomy according to content of the web sites associated with the host names. This classification process may be carried out automatically by accessing and analyzing the content of the web sites. The aggregator may be arranged to form 216 aggregate website audience personality profiles for each website class.

Figure 3:
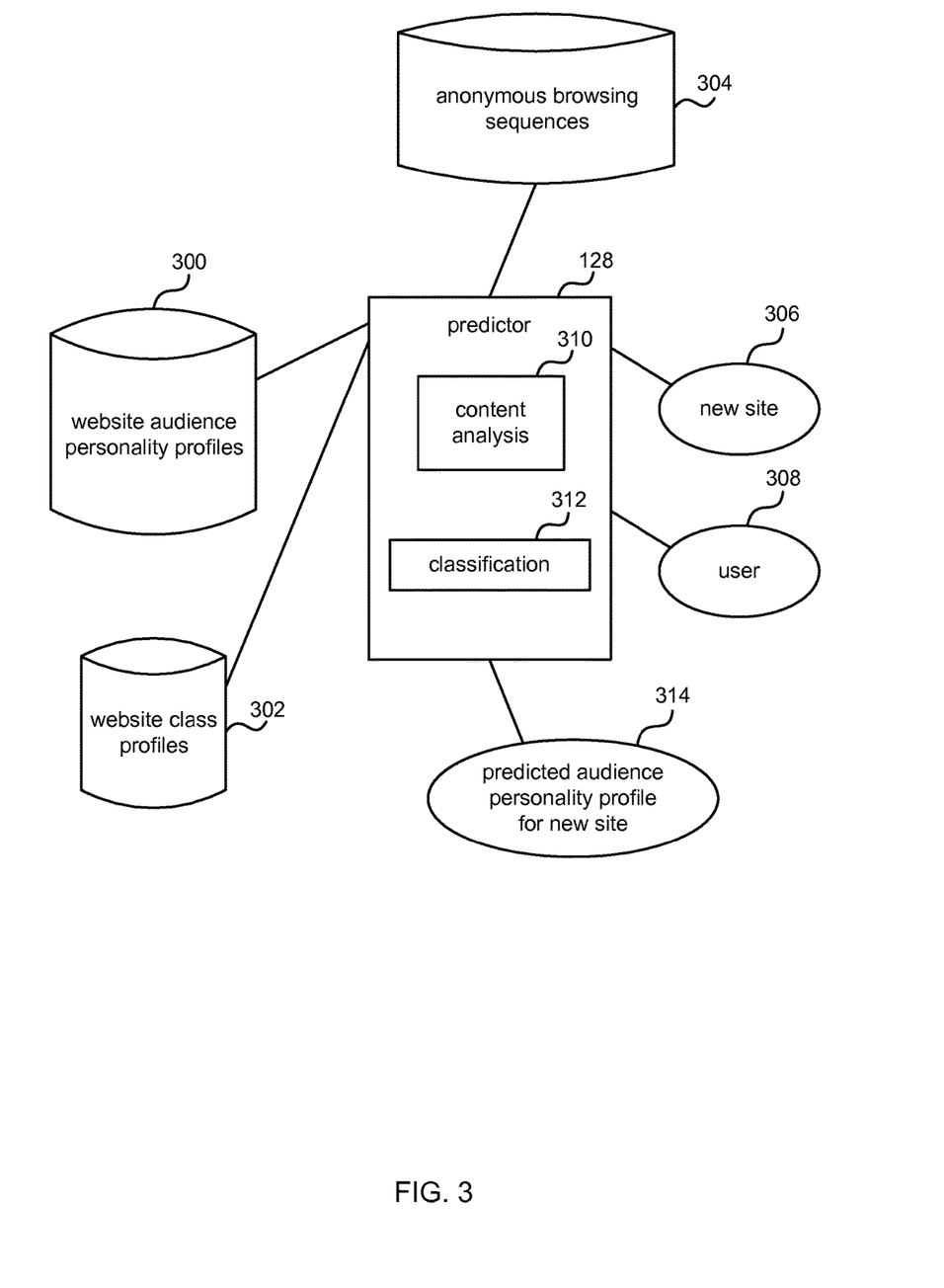
FIG. 3 is an example of the predictor component of FIG. 2 in more detail.

More detail of an example predictor is now given with reference to FIG. 3. A predictor 128 is arranged to take input from a store of anonymous browsing sequences 304 which is equivalent to that of FIG. 1 shown at 110. It also has access to personality profiles generated by the aggregator or machine learning components 120. These personality profiles comprise website audience personality profiles 300 and website class personality profiles 302 as discussed above. The predictor comprises at least a content analysis component 310 and a classification component 312.

In the case that a new site 306 is observed in a browsing sequence the predictor 128 receives an address such as a URL for that site. The content analysis component 310 accesses content of the new site 306 and identifies key words, images, or other key content. The key content is then used to classify the new site 306 using the classification component 312. For example, the classification component accesses a web site taxonomy and uses the key content together with the taxonomy to classify the new site into a web site class. In other examples, the new site 306 has already been classified, for example, by the web site provider, and details of the appropriate web site class are accessed from the site itself or from the URL.

The predictor 128 accesses the appropriate website class personality profile and assigns the same profile to the new site 306. The predictor is able to output a predicted audience personality profile for the new site 314 using the website class personality profile.

In the case that a user 308 has an observed browsing sequence, the predictor is able to select website audience personality profiles for the sites in the observed browsing sequence and aggregate those. This gives an aggregate personality profile of websites for the user. The predictor is then arranged to find other websites with audience personality profiles that are similar to the aggregate personality profile of web sites for the user. These other websites may then be recommended to the user. The predictor may recommend other sites, products, goods or services to the user on the basis of the aggregate personality profile of websites for the user. In this way a recommendation system is provided (see 124 of FIG. 1). The predictor may provide input to an advertising system such that advertisements to be displayed to the user are selected using the identified website audience personality profile and/or the aggregate personality profile of websites for the user.

As mentioned above the methods rely on natural communications network traffic comprising anonymous browsing sequences of users who opted-in to provide anonymized information about their browsing. It has been found that natural browsing sequences observed in this way can be used as described herein to create accurate and reliable website audience personality profiles and website class personality profiles. Because natural browsing sequences are subject to bias, noise and comprise relatively few serendipitously observed personality indicators this result is unexpected. By using large, web-scale amounts of data, and aggregating this as described herein accurate results are obtained.

In the examples discussed above a user may have a personality trait score on one or more personality dimensions and this score may be stored as a numerical value. It is also possible to store information about the certainty of each personality trait score. This requires more information to be tracked which for web scale applications is a technical hurdle; however, by doing so, accuracy may be further improved. For example, the aggregator 120 or machine learning component may comprise a probabilistic machine learning system.

In an example a regression random decision forest is used. A regression random decision forest comprises a plurality of decision trees. The random regression forest is trained using labeled training data comprising browsing sequences of users with known personality trait scores on at least one continuous valued variable such as degree of extraversion. An example using regression random decision forests is now described with reference to FIG. 4.

Figure 4:
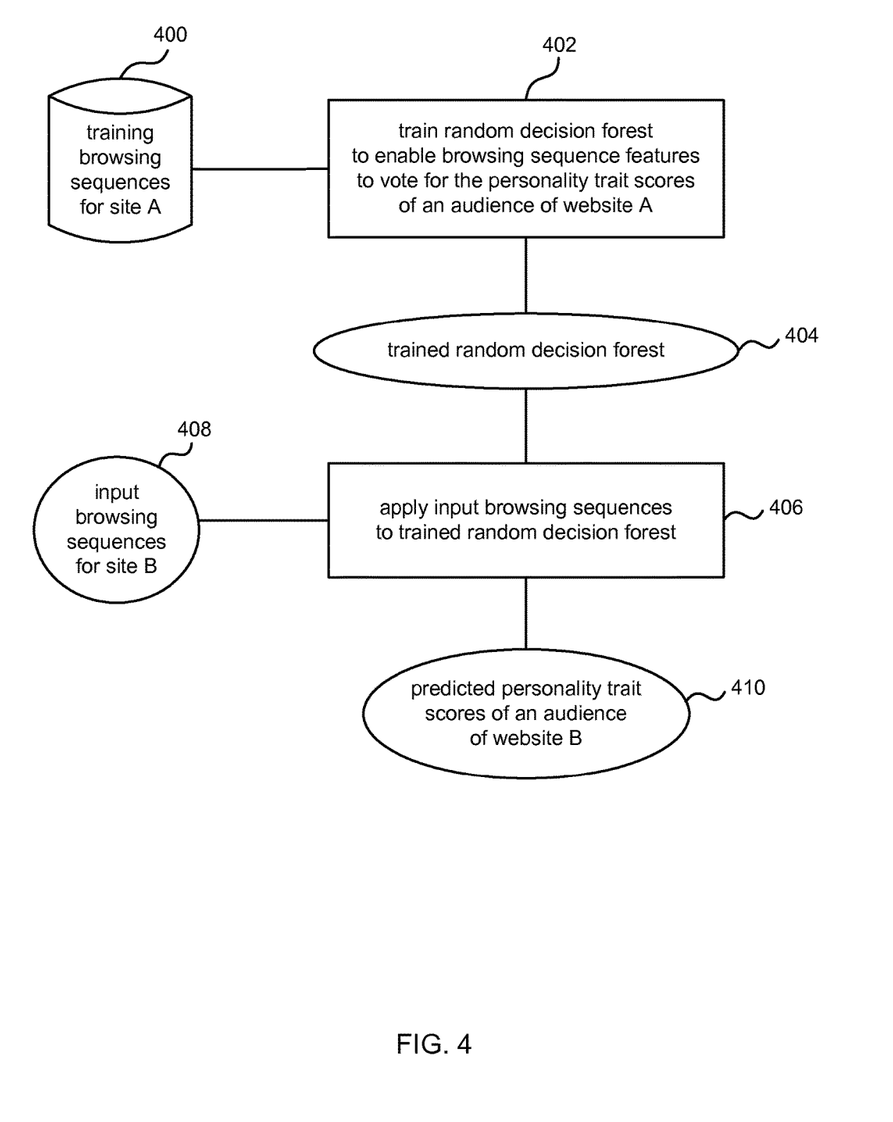
FIG. 4 is a flow diagram of an example method at a personality aggregator and predictor.

FIG. 4 is a flow diagram of predicting personality trait scores of a website audience from an input set of browsing sequences 408 comprising the website. A plurality of browsing sequences 400 that comprise the web site and that have specified personality trait scores is available. This training data may be obtained from natural communications traffic as described above using the pattern matcher and extractor.

A random decision forest is trained 402 to enable features of the training browsing sequences 400 to vote for personality trait scores of an audience. A random decision forest comprises one or more decision trees each having a root node, a plurality of split nodes and a plurality of leaf nodes. A browsing sequence may be pushed through trees of a random decision forest from the root to a leaf node in a process whereby a decision or vote is made at each split node. The decision is made according to features of the browsing sequence and parameters specified at the split node. At a split node the browsing sequence proceeds to the next level of the tree down a branch chosen according to the results of the decision. This process continues until the browsing sequence reaches a leaf node. The random decision forest may use regression or classification as described in more detail below. During training, parameter values are learnt for use at the split nodes and data is accumulated at the leaf nodes. For example, personality score votes are accumulated at the leaf nodes.

Storing all the personality score votes at the leaf nodes during training may be very memory intensive since large amounts of training data are typically used for practical applications. In some embodiments the votes are aggregated in order that they may be stored in a compact manner. Various different aggregation processes may be used as described in more detail below.

At test time a previously unseen browsing sequence 408 is input to the system to have personality trait scores predicted. It is applied to the trained random decision forest 406 to obtain predicted personality trait scores 401. The browsing sequence 408 may be sent through each tree of the trained random decision forest and personality score votes obtained from the leaves. Each browsing sequence may make a plurality of votes for each personality trait. These votes may be aggregated according to various different aggregation methods to give the predicted personality trait scores 410. The test time process is therefore a single stage process of applying an input browsing sequence (for a new website) to the trained random decision forest to directly obtain predicted personality trait scores of an audience of that website. This single stage process may be carried out in a fast and effective manner to give results in real-time and with high quality results.

Figure 5:
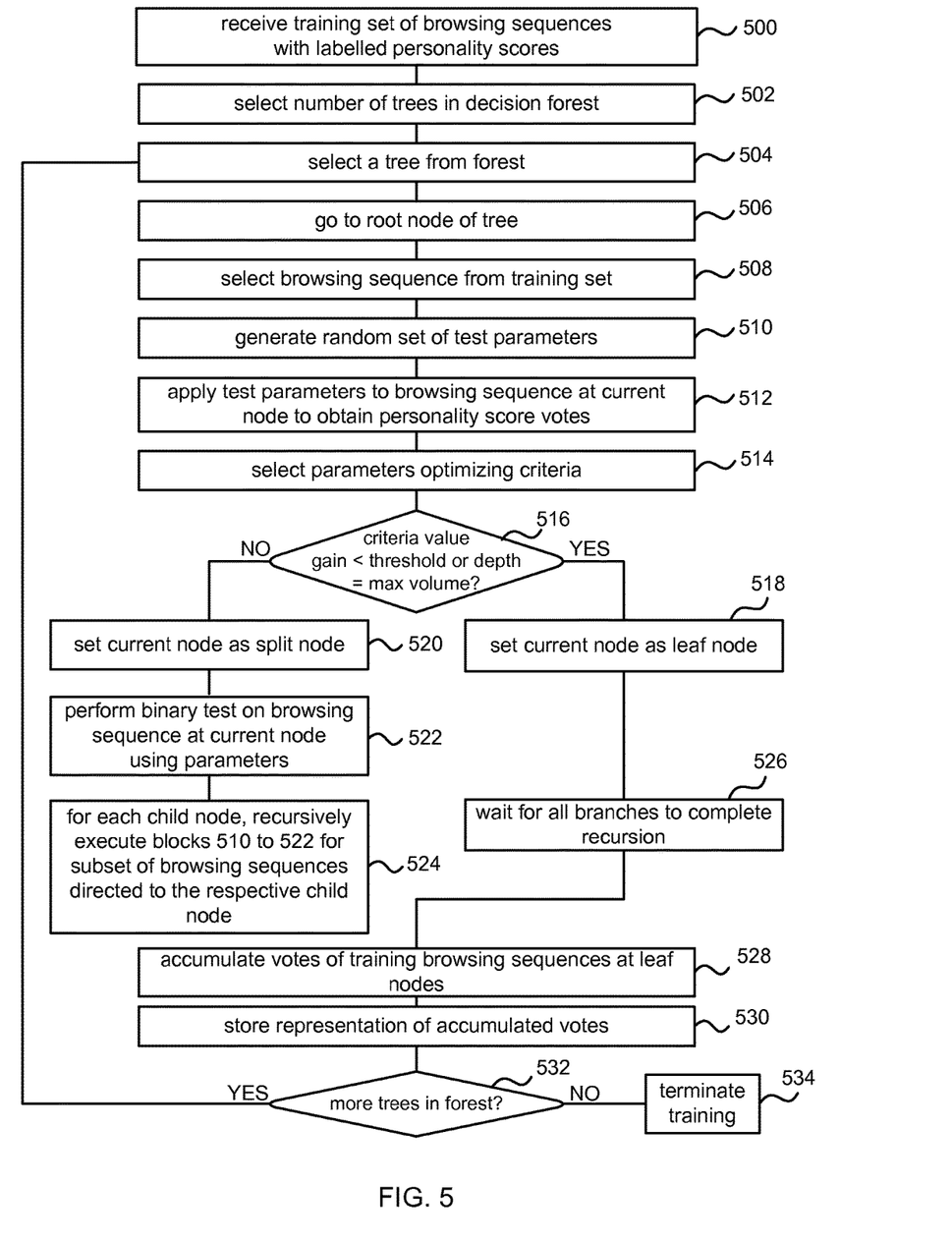
FIG. 5 is a flow diagram of a method of training a random decision forest.

FIG. 5 is a flowchart of a process for training a decision forest to identify personality trait scores of an audience of a given website in a set of one or more browsing sequences each of which comprises the given website. The decision forest is trained using a set of training browsing sequences. The set of training browsing sequences comprise browsing sequences having known personality trait scores of a user making that browsing sequence. This data may be obtained as described above from consenting users. Personality trait scores in the training browsing sequences are specified. Therefore, the training data forms a ground-truth database.

Referring to FIG. 5, to train the decision trees, the training set described above is first received 500. The number of decision trees to be used in a random decision forest is selected 502. A random decision forest is a collection of deterministic decision trees. Decision trees can be used in classification or regression algorithms, but can suffer from over-fitting, i.e. poor generalization. However, an ensemble of many randomly trained decision trees (a random forest) yields improved generalization. During the training process, the number of trees is fixed.

The following notation is used to describe the training process. The forest is composed of T trees denoted $\Psi_1, \ldots, \Psi_t, \ldots, \Psi_T$ with t indexing each tree. An example random decision forest is shown illustrated in FIG. 6. The illustrative decision forest of FIG. 6 comprises three decision trees: a first tree 600 (denoted tree $\Psi_1$); a second tree 602 (denoted tree $\Psi_2$); and a third tree 604 (denoted tree $\Psi_3$). Each decision tree comprises a root node (e.g. root node 606 of the first decision tree 600), a plurality of internal nodes, called split nodes (e.g. split node 608 of the first decision tree 600), and a plurality of leaf nodes (e.g. leaf node 610 of the first decision tree 600).

Figure 6:
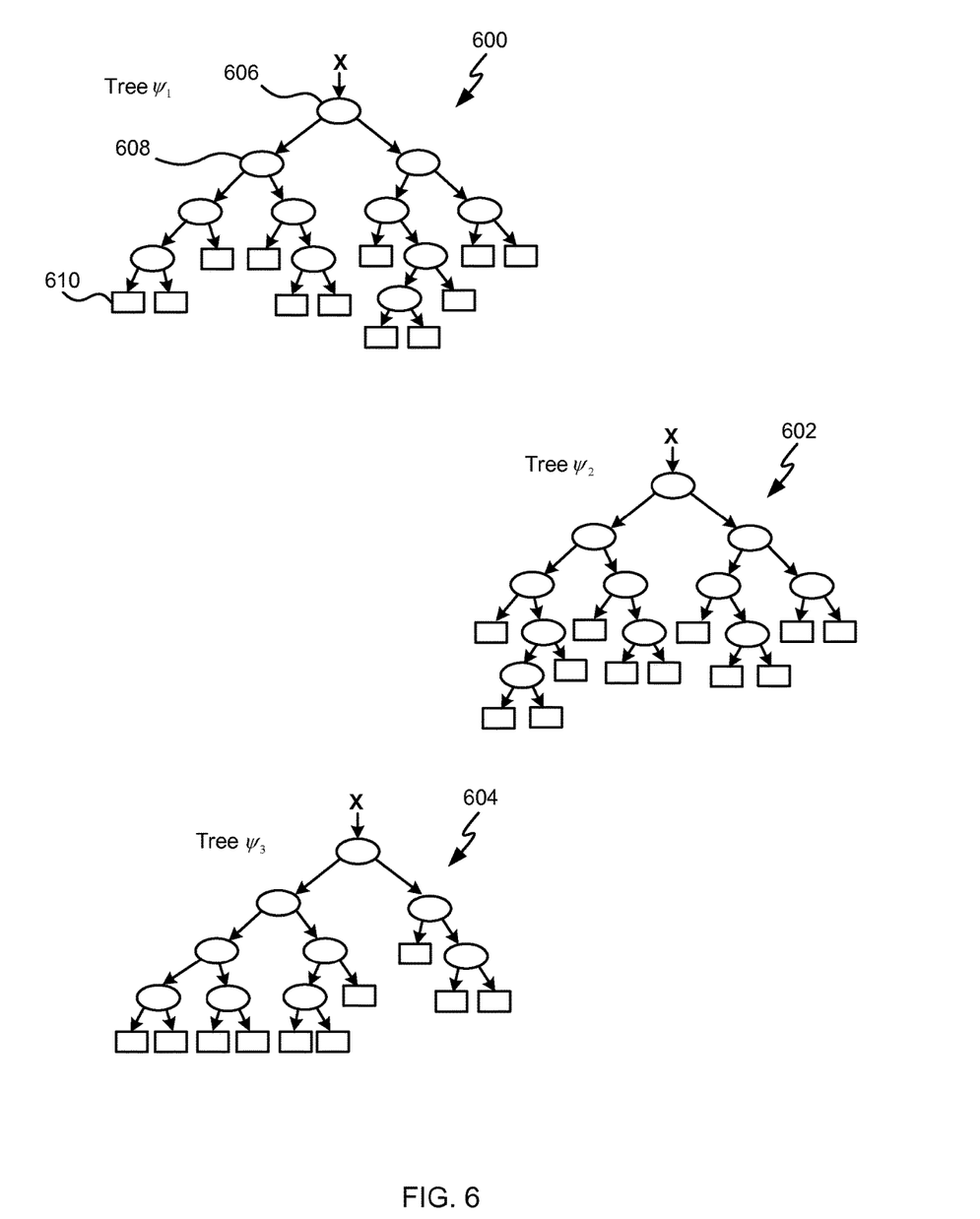
FIG. 6 is a schematic diagram of a random decision forest.

In operation, each root and split node of each tree performs a binary test on the input data and based on the result directs the data to the left or right child node. The leaf nodes do not perform any action; they store accumulated personality trait score votes (and optionally other information). For example, probability distributions may be stored representing the accumulated personality trait score votes.

The manner in which the parameters used by each of the split nodes are chosen and how the leaf node probabilities may be computed is now described. A decision tree from the decision forest is selected 604 (e.g. the first decision tree 600) and the root node 606 is selected 606.

A random set of test parameters are then generated 610 for use by the binary test performed at the root node as candidate tests. For example, the test parameters are selected at random from a specified list of parameters (also referred to as features of a browsing sequence or set of browsing sequences). Threshold values may also be randomly generated against which to compare the features. A non exhaustive list of example browsing sequence features (for a set of browsing sequences each comprising a specified website) is: number of browsing sequences in the set; average duration of browsing sequence in the set; average number of URLs in the browsing sequences of the set; number of occurrences of the URL of the specified website in the browsing sequences of the set; number of URLs other than that of the specified website in the browsing sequences of the set; number of website classes in the browsing sequences of the set; the distribution of number of occurrences of URLs in the browsing sequences of the set by website class; text features of content of websites in the browsing sequences of the set; text features of URLs in the browsing sequences of the set.; a distribution of times of the day at which browsing sequences of the set occurred; a distribution of geographical locations associated with the browsing sequences of the set.

The result of the binary test performed at a root node or split node determines which child node a browsing sequence is passed to. For example, if the result of the binary test is true, the browsing sequence is passed to a first child node, whereas if the result is false, the browsing sequence is passed to a second child node. For example, if the randomly chosen browsing sequence feature is "number of browsing sequences in the set" and the threshold values specify a range of 10 to 40 then the result of the test may be true when the number of browsing sequences is 30.

Then, every combination of test parameter may be applied 512 to each browsing sequence in the set of training data. In other words, available features are tried one after the other, in combination with available values of any thresholds for each browsing sequence in the training set. For each combination, criteria (also referred to as objectives) are calculated 514. In an example, the calculated criteria comprise the information gain (also known as the relative entropy). Other examples of criteria include but are not limited to: selecting parameters which reduce a variance of personality trait score votes for subsets of the browsing sequences at a split node; optimizing a balance of the tree such that a subset of browsing sequences which proceeds along a first branch of the split is similar in size to a subset of browsing sequences which proceeds along the second branch of the split. Combinations of different objectives may be used within individual trees or between trees of a decision forest. The combination of parameters that optimize the criteria (such as maximizing the information gain is selected 514 and stored at the current node for future use. As an alternative to information gain, other criteria can be used, such as Gini entropy, or the 'two-ing' criterion or others described below.

It is then determined 516 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 518 as a leaf node. Similarly, the current depth of the tree is determined (i.e. how many levels of nodes are between the root node and the current node). If this is greater than a predefined maximum value, then the current node is set 518 as a leaf node. Each leaf node has personality trait score votes which accumulate at that leaf node during the training process as described below.

It is also possible to use another stopping criterion in combination with those already mentioned. For example, to assess the number of example browsing sequences that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 520 as a split node. As the current node is a split node, it has child nodes, and the process then moves to training these child nodes. Each child node is trained using a subset of the training browsing sequences at the current node. The subset of browsing sequences sent to a child node is determined using the parameters that optimized the criteria. These parameters are used in the binary test, and the binary test performed 522 on all browsing sequences at the current node. The browsing sequences that pass the binary test form a first subset sent to a first child node, and the browsing sequences that fail the binary test form a second subset sent to a second child node.

For each of the child nodes, the process as outlined in blocks 510 to 522 of FIG. 5 are recursively executed 524 for the subset of browsing sequences directed to the respective child node. In other words, for each child node, new random test parameters are generated 510, applied 512 to the respective subset of browsing sequences, parameters optimizing the criteria selected 514, and the type of node (split or leaf) determined 516. If it is a leaf node, then the current branch of recursion ceases. If it is a split node, binary tests are performed 522 to determine further subsets of browsing sequences and another branch of recursion starts. Therefore, this process recursively moves through the tree, training each node until leaf nodes are reached at each branch. As leaf nodes are reached, the process waits 526 until the nodes in all branches have been trained. Note that, in other examples, the same functionality can be attained using alternative techniques to recursion.

Once all the nodes in the tree have been trained to determine the parameters for the binary test optimizing the criteria at each split node, and leaf nodes have been selected to terminate each branch, then votes may be accumulated 528 at the leaf nodes of the tree. This is the training stage and so particular browsing sequences which reach a given leaf node have specified personality trait scores known from the ground truth training data. A representation of the accumulated votes may be stored 530 using various different methods such as using a clustering process, storing a mean vote or other methods. Optionally sampling may be used to select votes to be accumulated and stored in order to maintain a low memory footprint. For example, reservoir sampling may be used whereby a fixed maximum sized sample of votes is taken. Selection may be random or in any other manner.

Once the accumulated votes have been stored it is determined 532 whether more trees are present in the decision forest. If so, then the next tree in the decision forest is selected, and the process repeats. If all the trees in the forest have been trained, and no others remain, then the training process is complete and the process terminates 534.

Therefore, as a result of the training process, one or more decision trees are trained using training browsing sequences. Each tree comprises a plurality of split nodes storing optimized test parameters, and leaf nodes storing associated representations of aggregated personality trait score votes. Due to the random generation of parameters from a limited subset used at each node, the trees of the forest are distinct (i.e. different) from each other.

The training process may be performed in advance of using the trained prediction system to predict audience personality trait scores in an observed set of browsing sequences. The decision forest and the optimized test parameters may be stored on a storage device for use in identifying personality trait scores in set of browsing sequences at a later time.

Figure 7:
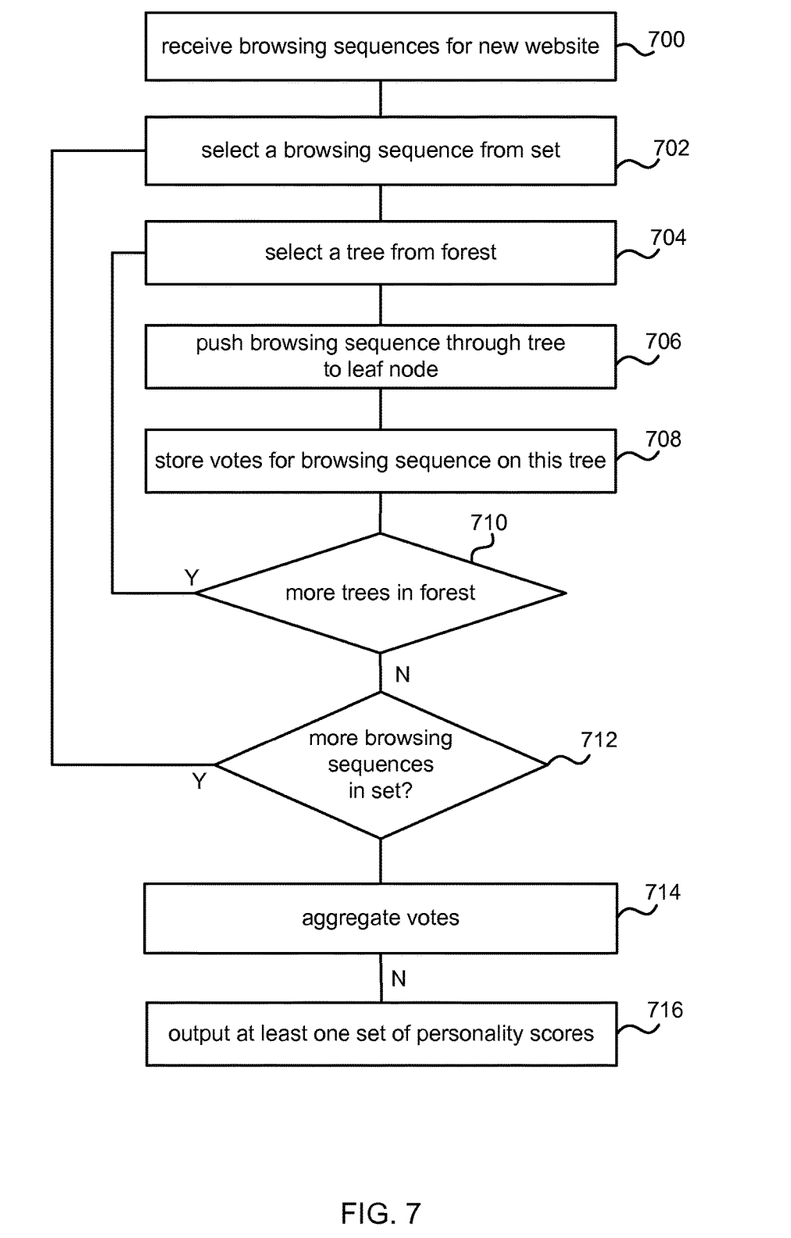
FIG. 7 is a flow diagram of a method of website audience personality trait prediction at test time.

FIG. 7 illustrates a flowchart of a process for predicting an audience personality profile for a previously unseen website using a decision forest that has been trained as described hereinabove. Firstly, browsing sequences are received 700 comprising the website for which an audience personality profile is required.

A browsing sequence is selected 702. A trained decision tree from the decision forest is also selected 704. The selected browsing sequence is pushed 706 through the selected decision tree, such that it is tested against the trained parameters at a node, and then passed to the appropriate child in dependence on the outcome of the test, and the process repeated until the browsing sequence reaches a leaf node. Once the browsing sequence reaches a leaf node, the accumulated votes (from the training stage) associated with this leaf node are stored 708 for this browsing sequence.

If it is determined 710 that there are more decision trees in the forest, then a new decision tree is selected 704, the browsing sequence pushed 706 through the tree and the accumulated votes stored 708. This is repeated until it has been performed for all the decision trees in the forest. Note that the process for pushing a browsing sequence through the plurality of trees in the decision forest can also be performed in parallel, instead of in sequence as shown in FIG. 7.

It is then determined 712 whether further unanalyzed browsing sequences are present, and if so another browsing sequence is selected and the process repeated. Once all the browsing sequences have been analyzed, then personality trait score votes are obtained for all browsing sequences.

As the browsing sequences are pushed through the trees in the decision forest, votes accumulate. These accumulated votes are aggregated 714 to form an overall vote aggregation for each browsing sequence. Optionally a sample of votes may be taken for aggregation. For example, N votes may be chosen at random, or by taking the top N weighted votes, and then the aggregation process applied only to those N votes. This enables accuracy to be traded off against speed.

At least one set of personality trait scores may then be output 716 where the personality trait scores may be confidence weighted. This helps any subsequent algorithm assess whether the proposal is good or not. More than one set of personality trait scores may be output; for example, where there is uncertainty.

In another example, a support vector regression process is used at the aggregator and predictor. A support vector regression process constructs one or more hyperplanes in a high dimensional space which can be used for regression. Training examples such as the training data described above is used to form the hyperplanes so that the hyperplanes have the largest distance to the nearest training data points of any class of the training data. For example, each training datapoint (such as a browsing sequence with known personality trait scores) is embedded in a high dimensional space. A hyperplane is then fit in this space using the support vector regression process, with the prediction for each location being the "height" of this point. In another embodiment least squares regression with boosted trees is used to form the hyperplane.

In an example, a method of predicting an aggregated or average personality profile of a website audience comprises: receiving a set of at least one browsing sequence comprising the website; for each browsing sequence, making a plurality of votes, each vote being for a personality trait score; the votes being made by comparing features of the browsing sequence with learnt thresholds; and aggregating the votes to obtain at least one predicted personality trait score of an audience of the website. In an example, the method comprises aggregating the votes by taking into account weights that have been learnt during a training process the weights expressing information about uncertainty of the votes. In an example, making the plurality of votes comprises applying each browsing sequence to a random decision forest which has been trained using a set of browsing sequences having labeled personality trait scores. In an example, the set of browsing sequences having labeled personality trait scores are obtained by: monitoring anonymized natural browsing sequences of consenting users; carrying out pattern matching to select any of the monitored browsing sequences which comprise personality trait scores; extracting details from the selected browsing sequences the details being uniform resource locators, or parts of uniform resource locators such as domain names or host names; and identifying the selected browsing sequences having extracted details which identify the website. In an example the method comprises making recommendations to a user who accesses the website on the basis of any of: the at least one predicted personality trait score of an audience of the website; and an aggregate audience personality profile of websites visited by the user. In an example a method comprises selecting advertisements for display to users who access the website on the basis of the at least one predicted personality trait score of an audience of the website.

Figure 8:
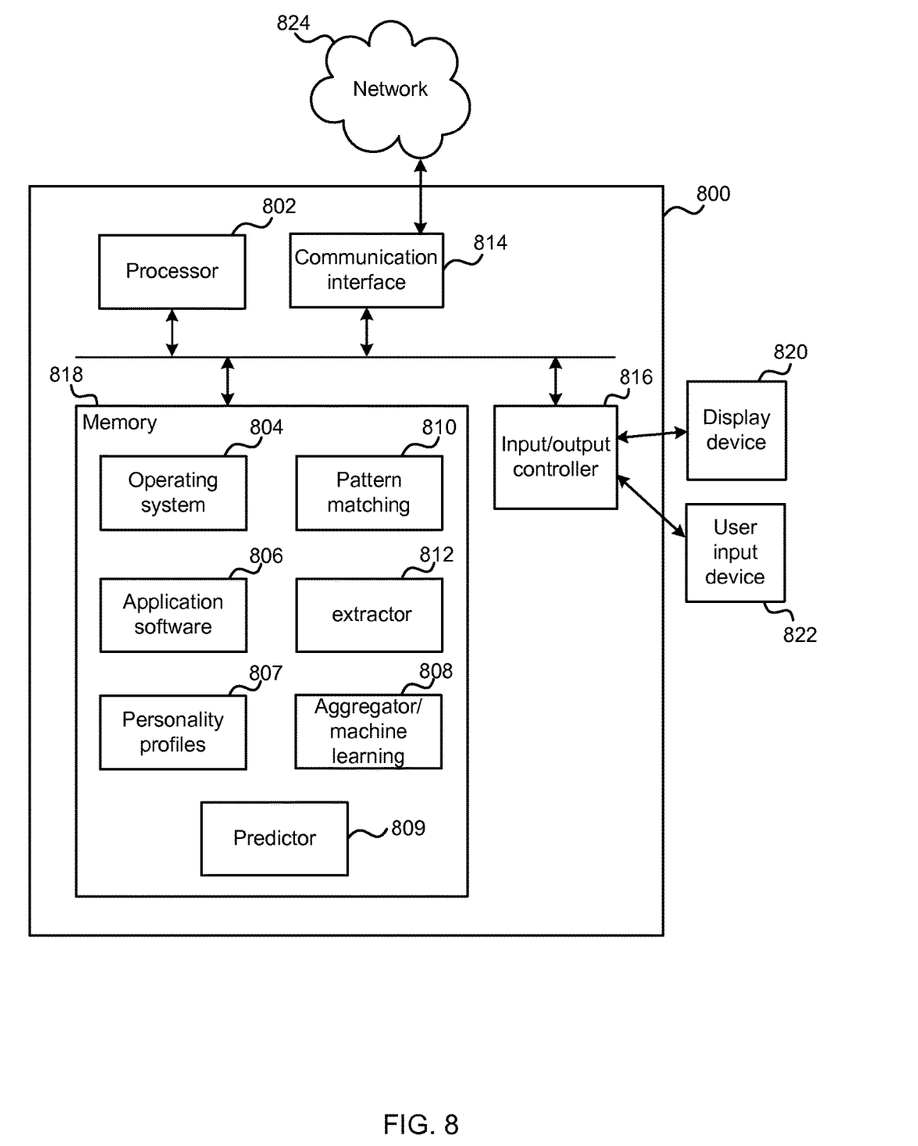
FIG. 8 illustrates an exemplary computing-based device in which embodiments of a personality aggregation engine, recommendation system or advertising system may be implemented.

FIG. 8 illustrates various components of an exemplary computing-based device 800 which may be implemented as any form of a computing and/or electronic device, and in which embodiments of a personality aggregation system, advertising system or recommendation system may be implemented.

The computing-based device 800 comprises an input/output controller 816 which is of any suitable type for receiving media content, Internet Protocol (IP) input, browsing sequences, web site content, user input such as from user input device 822 or other input. The device also comprises communication interface 814 which enables the device to communicate with other entities over a network 824 such as the internet, an intranet, or any type of communications network.

Computing-based device 800 also comprises one or more processors 802 which may be microprocessors, controllers or any other suitable type of processors for processing computer executable instructions to control the operation of the device in order to aggregate personality data. In some examples, for example where a system on a chip architecture is used, the processors 802 may include one or more fixed function blocks (also referred to as accelerators) which implement a part of the method of FIG. 2 or FIG. 4 in hardware (rather than software or firmware). Platform software comprising an operating system 804 or any other suitable platform software may be provided at the computing-based device to enable application software 806 to be executed on the device. A pattern matching component 810 is provided to identify personality indicators in URL or other browsing data. An extractor 812 is arranged to identify host names or web site addresses from URL or other browsing data. In some examples it extracts parts of URLs and in some cases whole URLs. An aggregator/machine learning component 808 is arranged to use the methods described herein to aggregate personality indicators and generate personality profiles of web site audiences, web site class audiences and/or users who have given their consent. A store at memory 818 holds personality profiles generated by the aggregator 808. A predictor 809 uses personality profiles generated by the aggregator 808 to predict personality profiles of new web sites and/or of users.

The computer executable instructions may be provided using any computer-readable media that is accessible by computing based device 800. Computer-readable media may include, for example, computer storage media such as memory 818 and communications media. Computer storage media, such as memory 818, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 818) is shown within the computing-based device 800 it will be appreciated that the storage may be distributed or located remotely and accessed via a network or other communication link (e.g. using communication interface 814).

The computing-based device 800 comprises an input/output controller 816 arranged to output display information to a display device 820 which may be separate from or integral to the computing-based device 800. The display information may provide a graphical user interface. The input/output controller 816 is also arranged to receive and process input from one or more devices, such as a user input device 822 (e.g. a mouse or a keyboard or a gesture-based control system). In an embodiment the display device 820 may also act as the user input device 822 if it is a touch sensitive display device. The input/output controller 816 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of generating a personality profile of a first website, the first website having an audience comprising a plurality of users and the personality profile comprising a score on at least one personality trait dimension, the method comprising:
monitoring anonymized natural browsing sequences of consenting users;
utilizing pattern matching to select any of the monitored browsing sequences which comprise personality trait scores;
extracting details from the selected browsing sequences, the details being uniform resource locators, or parts of uniform resource locators;
identifying the selected browsing sequences having the extracted details which identify a first web site;
calculating a personality profile of the first website by aggregating the personality trait scores of the identified browsing sequences of an audience of the first website when the number of identified browsing sequences exceeds a threshold value;
displaying advertisements to a user of the plurality of users, the advertisements being selected using the calculated personality profile of the first website.

2. A method as claimed in claim 1 wherein the browsing sequences comprise sequences of uniform resource locators (URLs) and wherein the pattern matching comprises matching against a list of specified personality test.

3. A method as claimed in claim 1 which further comprises filtering the browsing sequences to remove browsing sequences with less than a threshold number of URLs.

4. A method as claimed in claim 1 which further comprises filtering the browsing sequences to remove browsing sequences meeting criteria comprising at least one of: a duration greater than a working day, a frequency of website visits higher than a threshold, a duration of website visits greater than a threshold, a browsing sequence comprising more URLs than a threshold.

5. A method as claimed in claim 1 which further comprises filtering the browsing sequences to remove browsing sequences generated by automated entities by removing browsing sequences meeting criteria comprising at least one of: a duration greater than a working day, a frequency of website visits higher than a threshold, a duration of website visits greater than a threshold, a browsing sequence comprising more URLs than a threshold.

6. A method as claimed in claim 1 wherein aggregating personality trait scores comprises taking a weighted aggregation using weights related to any of: duration of website visit, clicks per day, visits per day.

7. A method as claimed in claim 1 wherein identifying the selected browsing sequences comprising identifying browsing sequences comprising details of a specified website class and wherein calculating the personality profile comprises calculating a personality profile of the audience of the class.

8. A method as claimed in claim 1 wherein aggregating the personality trait scores comprises forming a random decision forest comprising at least one decision tree and training the decision forest using the identified browsing sequences.

9. A method as claimed in claim 1 further comprising identifying a sub class to which the first website belongs; and predicting a personality profile of another website of the identified sub class using the calculated personality profile of the first website.

10. A method of predicting an aggregated or average personality profile of a website, the website audience comprising a plurality of users, comprising:
receiving a set of at least one browsing sequence comprising a first website;
for each browsing sequence, making a plurality of votes, each vote being for a personality trait score; the votes being made by comparing features of the browsing sequence with learnt thresholds;
aggregating the votes to obtain at least one predicted personality trait score of the first website; and
displaying advertisements to a user of the plurality of users, the advertisements being selected using the predicted personality trait score of the first website.

11. A method as claimed in claim 10 comprising aggregating the votes by taking into account weights that have been learnt during a training process the weights expressing information about uncertainty of the votes.

12. A method as claimed in claim 10 wherein making the plurality of votes comprises applying each browsing sequence to a random decision forest which has been trained using a set of browsing sequences having labeled personality trait scores.

13. A method as claimed in claim 12 wherein the set of browsing sequences having labeled personality trait scores are obtained by:
monitoring anonymized natural browsing sequences of consenting users;
carrying out pattern matching to select any of the monitored browsing sequences which comprise personality trait scores;
extracting details from the selected browsing sequences the details being uniform resource locators, or parts of uniform resource locators; and
identifying the selected browsing sequences having the extracted details which identify the first website.

14. A method as claimed in claim 13 which further comprises filtering the anonymized natural browsing sequences to remove browsing sequences meeting criteria comprising at least one of: a duration greater than a working day, a frequency of website visits higher than a threshold, a duration of website visits greater than a threshold, a browsing sequence comprising more URLs than a threshold.

15. A method as claimed in claim 13 wherein the anonymized natural browsing sequences comprise sequences of uniform resource locators (URLs) and wherein the pattern matching comprises any one or more of: matching against a list of specified personality test websites; searching for URLs with at least a specified number of parameters; searching for URLs containing words that indicate a personality test and checking if parameters in the URL resemble personality scores.

16. A method as claimed in claim 10 which further comprises making recommendations to a user who accesses the first website on the basis of any of: the at least one predicted personality trait score of the website; and an aggregate personality profile of websites visited by the user.

17. A method as claimed in claim 10 which further comprises selecting advertisements for display to users who access the first website on the basis of the at least one predicted personality trait score of the first website.

18. A system comprising:
an input arranged to receive anonymized natural browsing sequences of consenting users;
a processor configured to act as a pattern matcher arranged to select any of the received browsing sequences which comprise personality trait scores;

a processor configured to act as an extractor arranged to extract details from the selected browsing sequences, the details being uniform resource locators, or parts of uniform resource locators, and further arranged to identify the selected browsing sequences having the extracted details which identify a first website;

a processor configured to act as an aggregator arranged to calculate a personality profile of the first website by aggregating the personality trait scores of the identified browsing sequences of an audience of the first website, the audience comprising a plurality of users;

a processor to configured to display advertisements to a user of the plurality of users, the advertisements being selected using the calculated personality profile of the first website.

19. A system as claimed in claim 18 wherein a processor is further configured to act as a filter arranged to filter the browsing sequences to remove browsing sequences meeting criteria comprising at least one of: a duration greater than a working day, a frequency of website visits higher than a threshold, a duration of website visits greater than a threshold, a browsing sequence comprising more URLs than a threshold.

20. A system as claimed in claim 18 wherein the aggregator comprises any of: a random decision forest and a support vector regression process.

* * * * *